UNITED STATES PATENT OFFICE.

WILHELM WEILER, OF MUNICH, GERMANY, ASSIGNOR TO JACQUES SKLAREK, OF MUNICH, GERMANY.

PROCESS OF MANUFACTURING ARTIFICIAL STONE.

1,143,670. Specification of Letters Patent. Patented June 22, 1915.

No Drawing. Application filed February 25, 1913. Serial No. 750,540.

*To all whom it may concern:*

Be it known that I, WILHELM WEILER, a subject of the German Emperor, and resident of Munich, Germany, have invented a Process of Manufacturing Artificial Stone, of which the following is a specification.

The use of peat in the manufacture of artificial stone is already known. In all processes hitherto known the starting point was wet peat or peat in its natural state of moisture to which were added lime and chiefly hydraulic cement, the moisture of the peat being utilized to bind the cement. Products obtained in this way are not sufficiently strong for the majority of building purposes. The chief reason is that peat in its natural state contains other ingredients which prevent properly intimate binding. These materials are chiefly sand, earth and the so-called peat-meal, that is to say a pulverization of the substance of the peat in consequence of too rapid drying of the moor, which substance cannot be separated from moist peat.

According to the present invention the peat is dried rapidly before being used and is reduced to a fibrous material. The drying and tearing of the peat can be effected by drying the peat cut in summer, allowing its moisture content to freeze in winter in open sheds and then in the second summer disintegrating the peat in an opening mill, willowing machine or the like. The fibrous material obtained in this way is cleaned by riddling screens or by similar means so that the impurities mentioned above are separated out. The clean fibers are then intimately mixed in a dry state with hydraulic cement and are then soaked with the addition of magnesia and a suitable hardening medium such as soluble glass, (which is already known as a hardening substance for artificial stone), and dilute lime-water until a moist felt-like substance is produced and the cement sets properly. This mass is then placed in molds and subjected to a high pressure by which means a considerable portion of its moisture is expelled. The remainder is driven off by allowing it to dry for 8 to 10 days. The best proportions for every part of peat are $\frac{1}{12}$ part hydraulic cement, $\frac{1}{50}$ part magnesia, and $\frac{1}{4}$ part of 50% soluble glass. Stones produced in this way can be used for all building purposes. They are not hygroscopic and are fire-proof as proved by experiment.

A stone produced by this process was exposed to a strong forge-fire. In order to ascertain the temperature attained a number of strips of metal of known melting-points, namely tin, lead, zinc, aluminium, brass and copper were fixed to an iron bar 5 mm. thick and placed between the stone and the fire. The separate strips were melted after the following intervals: Tin immediately after introduction corresponding to a temperature of 230° C. Lead after a few seconds, corresponding to a temperature of 380° C. Zinc after one minute corresponding to a temperature of 412° C. Aluminium after 100 seconds, corresponding to a temperature of 654° C. Brass after 110 seconds, corresponding to a temperature of 900° C. Copper after 120 seconds corresponding to a temperature of 1084° C. The iron bar 5 mm. thick was melted after 3 minutes 4 seconds corresponding to a temperature of 1200° C. After eight minutes the stone could still be touched with the hand on the side away from the fire, the other side had slowly become incandescent. After twelve minutes the stone was taken out of the fire, it was still intact and no cracks were to be seen. It could still be touched with the bare hand on the side remote from the fire.

To produce an insulating medium in the shape of dishes, pipes, sleeves et cetera having greater elasticity a little animal glue and kieselguhr could be added to the cleaned fibers as well as the cement, magnesia, soluble glass and lime-water.

The proportions preferred are 60% prepared peat, 4% cement, 4% soluble glass, 4% magnesia, 6% kieselguhr, 16% glue, 6% lime-water.

Having now fully described my said invention what I claim and desire to secure by Letters Patent is:

1. The herein described process of manufacturing artificial stone, consisting in admixing hydraulic cement with clean dried fibrous peat, adding magnesia and soluble glass to the mixture, and moistening said mixture with lime water until a felt-like substance is formed and the cement sets.

2. The herein described process of manufacturing artificial stone, consisting in admixing hydraulic cement with clean dried fibrous peat, adding magnesia and soluble glass to the mixture, moistening said mixture with lime water, and finally adding animal glue and kieselguhr thereto.

3. The herein described process of manufacturing artificial stone, consisting in admixing hydraulic cement with clean dried fibrous peat, adding magnesia and a hardening medium to the mixture, moistening said mixture with lime-water until a felt-like substance is produced, molding said substance, and finally applying pressure thereto to expel moisture therefrom.

4. The herein described process of manufacturing artificial stone, consisting in admixing hydraulic cement with clean dried fibrous peat, adding magnesia and soluble glass to the mixture, moistening said mixture with lime water, molding said mixture under pressure whereby a portion of the moisture is expelled, and finally drying the resulting product.

In testimony whereof I have hereunto set my hand in the presence of two subscribing witnesses.

WILHELM WEILER.

Witnesses:
A. V. W. COYLE,
RICHARD LENY.

Copies of this patent may be obtained for five cents each, by addressing the "Commissioner of Patents, Washington, D. C."